United States Patent Office.

GUSTAV ADOLPH NEUMEYER, OF ALTENBURG, GERMANY.

Letters Patent No. 66,378, dated July 2, 1867.

---

IMPROVED POWDER FOR FIRE-ARMS AND FOR BLASTING.

---

*The Schedule referred to in these Letters Patent and making part of the same.*

---

TO ALL WHOM IT MAY CONCERN:

Be it known that I, GUSTAV A. NEUMEYER, of Altenburg, in the Duchy of Saxe Altenburg, Germany, have invented a new and useful improvement in Powder; and I do hereby declare that the following is a full, clear, and exact description thereof, which will enable others skilled in the art to make and use the same.

This invention relates to an explosive powder which is intended to be more safe, but as powerful as the ordinary powder now in use. It consists, like the old powder, of saltpetre, sulphur, and carbon, in variable proportions. It differs in regard to the material from the old powder in this:

First. Instead of using the sulphur in sticks, as in the fabrication of the old powder, I use the flower of sulphur, (*sulphur depuratum sublimatum.*)

Second. In the fabrication of the gunpowder I do not employ charcoal, but brown coal of the common sort, which is used extensively as fuel. This is a new and most essential alteration. It was not until I made this discovery that I succeeded in manufacturing a gunpowder exhibiting the desired properties as hereinafter described. The great cheapness of the material I consider an additional advantage.

Third. In the fabrication of the blasting-powder I use charcoal of all sorts of common wood, as pine, birch, cedar, &c., without any choice. The charcoal is burnt out of freshly cut wood, not out of dried wood kept for years for that purpose, as in the fabrication of the old powder.

My blasting-powder is made as follows: The ingredients, saltpetre, sulphur, and charcoal, in various proportions, according to the required strength, are put together in a barrel or drum of wood, through the centre of which an axle-tree is fitted, which has a number of projecting teeth that reach nearly to the outer circle of the drum. To a mixture of one hundred (100) pounds of the ingredients twenty pounds of water are added, and then the whole mass is mixed together by turning the toothed axle-tree for twenty minutes. In this manner the ingredients become thoroughly mixed, and full strength and efficiency of the powder is provided. The mass is then spread out for drying, and when dried ready for use.

The gunpowder is made as follows: The ingredients, in various proportions, saltpetre, sulphur, and brown coal, are mixed in a dry state in a wooden barrel or drum, and then fifteen pounds of water to one hundred pounds of ingredients added, and the mass compounded for four hours in iron cylinders. The mass is then grained or separated in sieves in the usual manner and spread out for drying.

This powder does not explode when air has access to it, but burns in such a case with a brilliant flame. When confined in a gun, or in any air-tight vessel, it explodes with the same force as the powder now used. The blasting-powder explodes with even more force. It requires more heat to ignite than ordinary powder, and as it cannot be ignited by sparks from steel or flint, or by friction or blows, it is free from all danger in transportation. It leaves less residuum than ordinary powder when not exposed to the air and when exploded in a gun; but when air has access to it it leaves a large quantity of sulphurous matter, which hardens as it cools. The powder retains its full strength after being wet and re-dried. It makes less smoke, and the smoke is lighter than that of ordinary powder, which is of considerable importance in mines. The recoil of guns is not as heavy when loaded with this as when loaded with the ordinary powder. The powder can be manufactured with complete safety to the operatives and to the neighborhood where it is made.

Having thus described my invention, what I claim as new, and desire to secure by Letters Patent, is—

A blasting and explosive powder, when made of the ingredients and in the manner herein set forth.

The above specification of my invention signed by me this 24th day of April, 1867.

GUSTAV ADOLPH NEUMEYER.

Witnesses:
    C. G. ROTHE, M. D.,
    V. LOMENO.